US009555726B2

(12) United States Patent
Jafri et al.

(10) Patent No.: US 9,555,726 B2
(45) Date of Patent: Jan. 31, 2017

(54) SEATBACK ENERGY MANAGEMENT SYSTEM

(71) Applicant: Zodiac Seats US LLC, Gainesville, TX (US)

(72) Inventors: Aamir Jafri, Little Elm, TX (US); Roberto Cervantes, Corinth, TX (US); David Tripp, Denton, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 14/423,195

(22) PCT Filed: Aug. 23, 2013

(86) PCT No.: PCT/US2013/056344
§ 371 (c)(1),
(2) Date: Feb. 23, 2015

(87) PCT Pub. No.: WO2014/031934
PCT Pub. Date: Feb. 27, 2014

(65) Prior Publication Data
US 2015/0202999 A1    Jul. 23, 2015

Related U.S. Application Data

(60) Provisional application No. 61/692,336, filed on Aug. 23, 2012.

(51) Int. Cl.
*A47C 7/62* (2006.01)
*A47C 31/00* (2006.01)
(Continued)

(52) U.S. Cl.
CPC ....... *B60N 2/42709* (2013.01); *B60R 11/0235* (2013.01); *B64D 11/0015* (2013.01);
(Continued)

(58) Field of Classification Search
CPC ............ B60R 11/0235; B60R 11/0229; B60R 2011/0017; B60R 2011/0078; B60N 2/48; B60N 2/42709; B60N 2/4876; B64D 11/00151; B64D 11/00152; B64D 11/0619
(Continued)

(56) References Cited

U.S. PATENT DOCUMENTS 6,739,654 B1    5/2004 Shen et al.
6,883,870 B2 *  4/2005 Jost ...................... B60N 2/4808
                                            297/217.3
(Continued)

FOREIGN PATENT DOCUMENTS

DE    202007008641 U1    11/2007
EP       1992520 A2       11/2008

OTHER PUBLICATIONS

International Patent Application No. PCT/US2013/056344, International Preliminary Report on Patentability dated Mar. 5, 2015.
(Continued)

*Primary Examiner* — Chi Q Nguyen
(74) *Attorney, Agent, or Firm* — Kilpatrick Townsend & Stockton LLP; Dean W. Russell; Tiffany L. Williams

(57) ABSTRACT

Described are video monitor assemblies (10) including a bezel assembly (16) coupled to a passenger seatback (12), wherein the bezel assembly includes a monitor (30) and a bezel (28), the monitor coupled to the bezel via low load fasteners (44) and high load fasteners (46), wherein the low load fasteners (44) are configured to fail or shear from a force applied to the monitor (30) during a head impact, and the high load fasteners (46) are configured to withstand the force applied to the monitor during the head impact.

15 Claims, 5 Drawing Sheets

(51) Int. Cl.
*B60N 2/427* (2006.01)
*B64D 11/00* (2006.01)
*G06F 1/16* (2006.01)
*B64D 11/06* (2006.01)
*H04N 5/655* (2006.01)
*B60R 11/00* (2006.01)
*B60N 2/48* (2006.01)
*B60R 11/02* (2006.01)

(52) U.S. Cl.
CPC .... *B64D 11/00151* (2014.12); *B64D 11/0619* (2014.12); *G06F 1/1601* (2013.01); *G06F 1/1613* (2013.01); *G06F 1/1637* (2013.01); *H04N 5/655* (2013.01); *B60N 2/48* (2013.01); *B60N 2/4876* (2013.01); *B60R 11/0229* (2013.01); *B60R 2011/0015* (2013.01); *B60R 2011/0017* (2013.01); *B60R 2011/0078* (2013.01); *B64D 11/00152* (2014.12)

(58) Field of Classification Search
USPC ........ 297/217.3, 217.1, 216.12, 188.04, 185; 248/837, 466, 477, 479; 312/242, 245
See application file for complete search history.

(56) References Cited

U.S. PATENT DOCUMENTS

| | | | | |
|---|---|---|---|---|
| 7,040,697 | B1 * | 5/2006 | Tuccinardi | B60R 11/0235 297/188.04 |
| 7,201,354 | B1 * | 4/2007 | Lee | B60R 11/0235 248/231.9 |
| 7,201,356 | B2 * | 4/2007 | Huang | F16M 13/02 248/27.3 |
| 7,591,508 | B2 * | 9/2009 | Chang | B60R 11/0235 297/217.3 |
| 7,597,393 | B1 * | 10/2009 | Tuccinardi | B60R 11/0211 297/188.04 |
| 7,637,565 | B2 * | 12/2009 | Kuno | A47C 7/38 297/188.05 |
| 7,758,117 | B2 * | 7/2010 | Chang | B60R 11/0235 297/217.1 |
| 7,866,746 | B2 * | 1/2011 | Watanabe | B60R 11/0235 297/188.04 |
| 8,499,031 | B1 * | 7/2013 | Kirby, Jr. | H04L 69/08 709/203 |
| 2004/0007906 | A1 | 1/2004 | Park et al. | |
| 2011/0164370 | A1 | 7/2011 | McClure et al. | |
| 2011/0272548 | A1 | 11/2011 | Rudkowski et al. | |

OTHER PUBLICATIONS

International Patent Application No. PCT/US2013/056344, Search Report and Written Opinion dated Nov. 19, 2013.

* cited by examiner

SEATBACK ENERGY MANAGEMENT SYSTEM

CROSS REFERENCE TO RELATED APPLICATIONS

This application is the U.S. national phase entry of International Application Serial No. PCT/US2013/056344, filed Aug. 23, 2013, entitled "Seatback Energy Management System," which application is related to and claims priority benefits from U.S. Provisional Application Ser. No. 61/692,336, filed Aug. 23, 2012, entitled "Seatback Head Impact Energy Management System." The '344 and '336 applications are hereby incorporated in their entireties by this reference.

FIELD OF THE INVENTION

The invention relates to energy absorbers in seat back systems for passenger seats or the like.

BACKGROUND

Head Injury Criterion ("HIC") is a measure of the likelihood of head injury resulting from an impact. The HIC is used to assess safety related to occupants. Normally, this variable is derived from the acceleration/time history of an accelerometer mounted at the center of gravity of a dummy's head when the dummy is exposed to crash forces. As a result, HIC includes the effects of head acceleration and the duration of the acceleration (i.e., large accelerations may be tolerated if the duration is very short). Another test criterion is delethalization, which includes requirements that limit the exposure of sharp edges to occupants. During a crash event, sharp edges may occur as a result of head impact.

In various modes of transportation, many passenger seats are placed behind other passenger seats. These passenger seats may be designed with a variety of comforts for passengers seated thereon, including communication and entertainment features, such as video monitors, telephones, shrouds, or other items. For convenience and individual comfort, the video monitors are typically mounted in the line of sight of the occupants, usually behind the headrest of the forward seat. During a minor crash landing, a passenger may be thrown forward so that the passenger's head and/or body strikes these structures due to inertial loads from the event.

Therefore, the addition of video monitors in passenger seatbacks may pose a challenge to occupant safety since impact testing must show allowable HIC according to FCC regulations. Furthermore, the video monitor display may delaminate upon impact, which may create sharp edges and also pose a challenge to occupant safety since impact testing must also show allowable delethalization according to FCC regulations.

Conventionally, energy dissipation solutions focused on allowing the passenger seatback to pivot forward in a controlled manner via features located in the lower back area of the passenger seatback that give way under a certain load. Generally, these features include metallic brackets with a designed shear area or shear bolts that are attached to the back diaphragm of the seat. There are, however, limitations on the adjustability of the load under which these features are designed to give way.

As a result, it may be desirable to integrate monitors into passenger seatback that have energy dissipation features included at the location of the monitor installation, which will allow for energy dissipation within allowable HIC values and prevents monitor display screen delamination.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a video monitor assembly comprises a bezel assembly coupled to a passenger seatback, wherein the bezel assembly comprises a monitor and a bezel, the monitor coupled to the bezel via low load fasteners and high load fasteners, wherein the low load fasteners are configured to fail or shear from a force applied to the monitor during a head impact, and the high load fasteners are configured to withstand the force applied to the monitor during the head impact. A passenger seat may comprise the bezel assembly coupled to the passenger seat back. In some embodiments, the low load fasteners may be positioned in locations that allow the monitor to remain pivotally attached to the bezel after the low load fasteners have failed or sheared.

In other embodiments, the video monitor assembly may comprise a bezel assembly coupled to a passenger seat back, wherein the bezel assembly comprises a monitor and a bezel, the monitor coupled to the bezel via at least a plurality of low load fasteners, wherein low load fasteners are configured to fail or shear from a force applied to the monitor during a head impact and are positioned in locations that allow the monitor to remain pivotally attached to the bezel after the low load fasteners have failed or sheared.

In some embodiments, the low load fasteners are located at least around an upper edge and sides of the monitor. The low load fasteners may be formed of nylon. In certain embodiments, the high load fasteners are formed of steel.

According to some embodiments, the monitor may pivot forward relative to the bezel during the head impact. The monitor may further comprise a display screen, which does not delaminate from the force applied to the monitor during the head impact.

In certain embodiments, a video shroud may be positioned between the bezel assembly and the passenger seatback.

DETAILED DESCRIPTION

Figure 1:
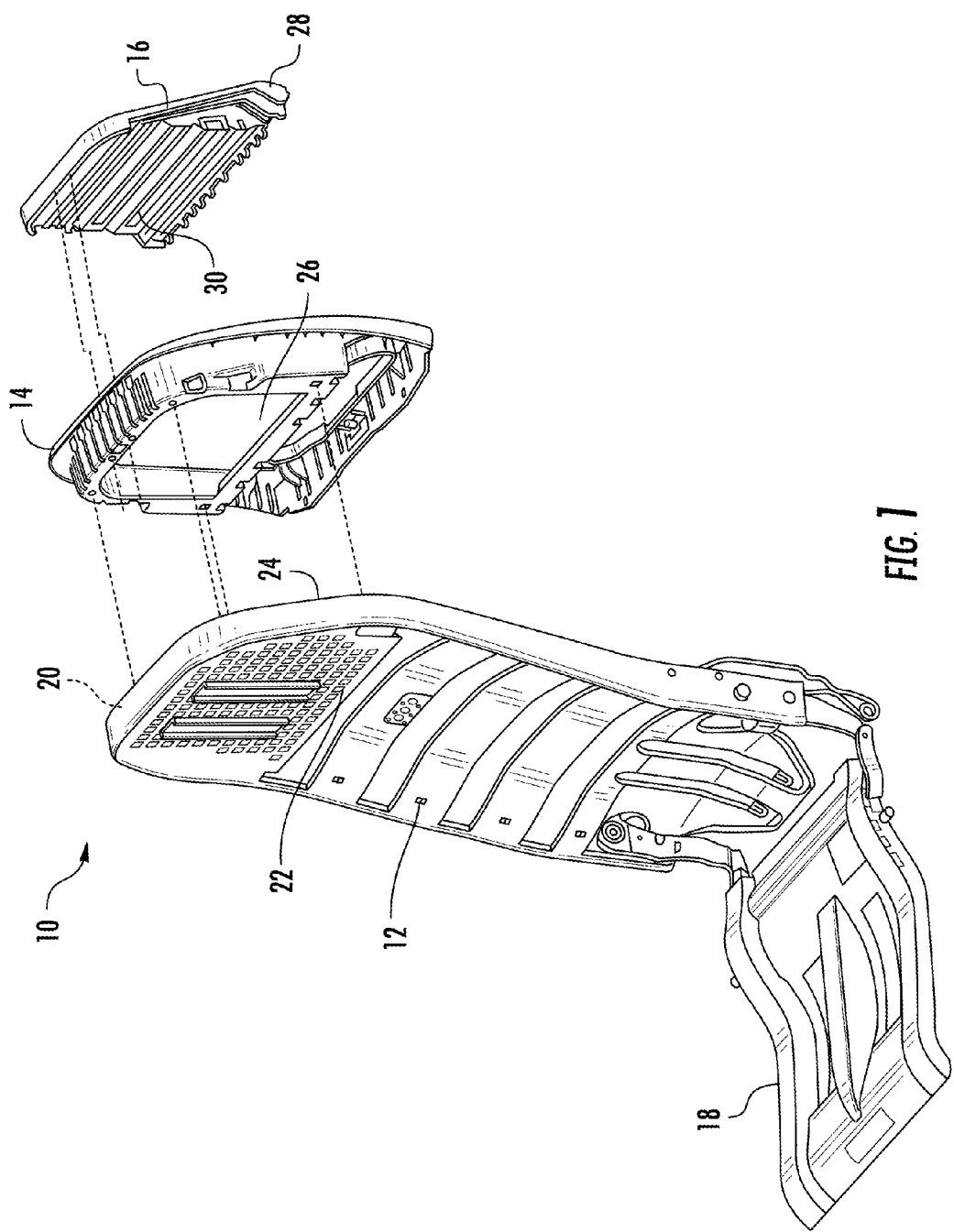
FIG. 1 is an exploded forward perspective view of a video monitor assembly according to certain embodiments of the present invention.
Figure 2:
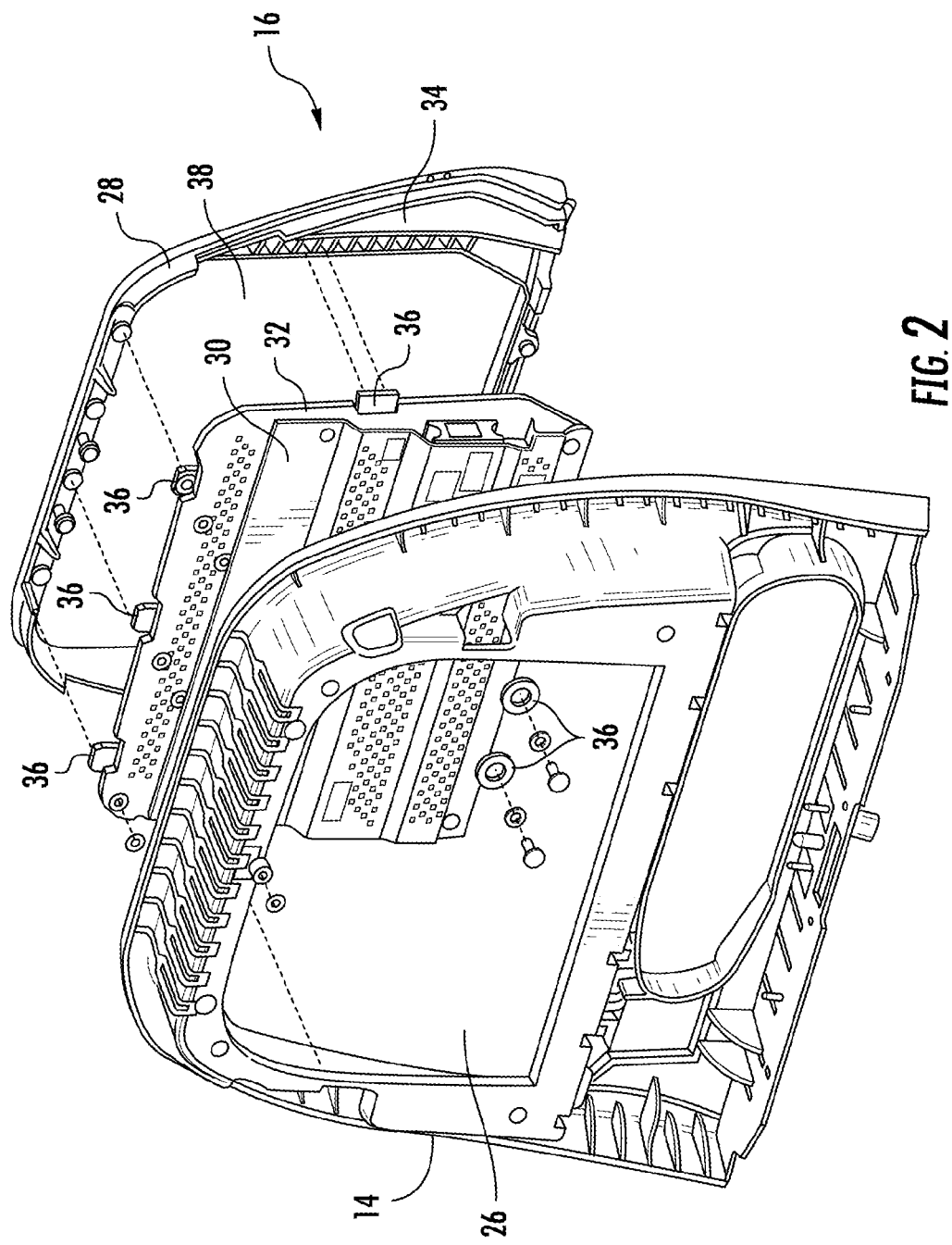
FIG. 2 is an exploded forward perspective view of a video shroud and a bezel assembly of the video monitor assembly of FIG. 1.
Figure 3:
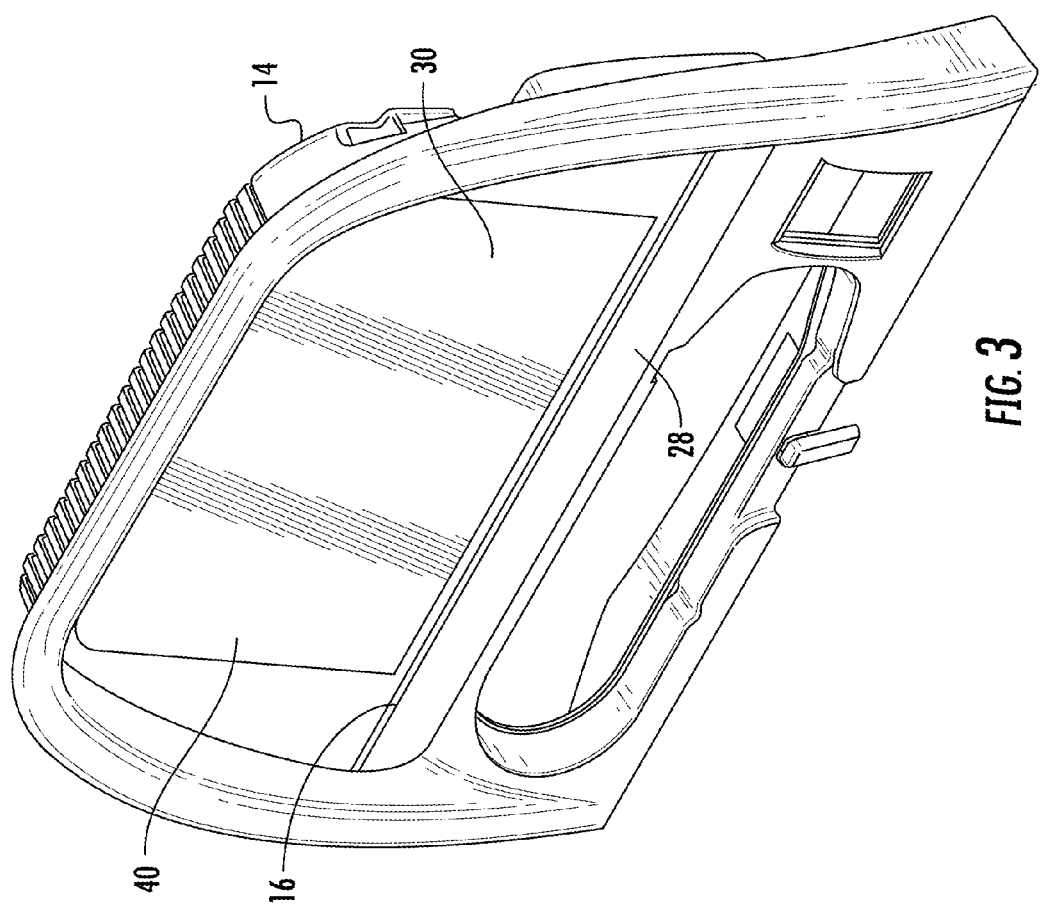
FIG. 3 is an aft perspective view of the assembled video shroud and bezel assembly of FIG. 2.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention provide video monitor assemblies for use with a passenger seat. While the video monitor assemblies are discussed for use with aircraft seats, they are by no means so limited. Rather, embodiments of the video monitor assemblies may be used in passenger seats or other seats of any type or otherwise as desired.

FIGS. 1-5B illustrate embodiments of a video monitor assembly 10. The video monitor assembly 10 comprises a seatback 12, a video shroud 14, and a bezel assembly 16.

The seatback 12 is part of a passenger seat 18, and comprises a recess 20 that may be formed by a back surface 22 surrounded on at least three sides by a lip 24. The back surface 22 and the lip 24 may be formed of materials including but not limited to aluminum, stainless steel, other metallic materials, composite materials, or other similar materials. In these embodiments, such as the embodiments best illustrated in FIG. 1, the recess 20 may have any suitable shape including but not limited to rectilinear, trapezoidal, parabolic, or other suitable shape that does not exceed the outer perimeter of the seatback 12. In addition, the recess 20 may have any suitable depth that does not exceed the overall thickness of the seatback 12. In some embodiments, the depth of the recess 20 may have approximately the same dimension as the thickness of the seatback 12. In other embodiments, the depth of the recess 20 may be less than the thickness of the seatback 12.

In certain embodiments, as shown in FIG. 1, the video shroud 14 may be coupled to the seatback 12. One of ordinary skill in the relevant art will understand that any suitable coupling technique may be used to attach the video shroud 14 to the seatback 12 including but not limited to mechanical fasteners such as screws, bolts, rivets, compression fit, or other suitable fasteners. The video shroud 14 may have a three dimensional shape that corresponds to at least a portion of the lip 24 and the back surface 22 of the recess 20 in the seatback 12.

The video shroud 14 may include an aperture 26 in a region that will be located behind the bezel assembly 16, which is described in more detail below. The video shroud 14 material is not included behind the bezel assembly 16 because it does not provide additional aesthetic or protective benefit and adds unnecessary weight to the video shroud 14.

The video shroud 14 is pulled snugly against the back surface 22 by the coupling of the bezel assembly 16 to the seatback 12 without the need for additional fasteners. In a full shroud embodiment (not shown), additional fasteners may be used to secure the video shroud 14 to portions of the seatback 12 below the bezel assembly 16.

The video shroud 14 is typically formed of a material that resists stains and is easily and quickly sanitized between passenger uses. Suitable materials for forming the video shroud 14 include but are not limited to plastics (vacuum-formed, injection molded, or thermoformed), such as polycarbonate, polyethylene, polypropylene, polyvinyl chloride, or other similar plastics, metallic materials, composite materials, or other similar materials. As a result, the video shroud 14 provides a protective covering for at least a portion of the seatback 12.

In some embodiments, such as the embodiments illustrated in FIGS. 1-5B, the bezel assembly 16 comprises a bezel 28 and a monitor 30.

The bezel 28 may be formed of materials including but not limited to injection molded or thermoformed plastic, aluminum, sheet metal, stainless steel, other metallic materials, composite materials, or other similar materials.

The monitor 30 may be a display for an IFE or other entertainment devices, and may be replaced with other electronic devices that include a screen. The monitor 30 may have any suitable outer perimeter shape 32 including but not limited to rectilinear, trapezoidal, parabolic, or other suitable shape that does not exceed the outer perimeter of the recess 20.

The monitor 30 is coupled to an inner surface 34 of the bezel 28 via any suitable mechanical fasteners including but not limited to screws, bolts, pins, rivets, or other similar fastening devices. In certain embodiments, as illustrated in FIGS. 2 and 4-5B, the monitor 30 includes attachment tabs 36 located around the perimeter of the monitor 30 through which fasteners are inserted and used to connect the monitor 30 to the bezel 28. A person of ordinary skill in the relevant art will understand that the monitor 30 may include any suitable mounting structure, including tabs of different shapes, quantity, and location, or mounting holes or other mounting surfaces designed to utilize fasteners that can be selected based on specific material properties that provide suitable coupling results between the monitor 30 and the bezel 28.

The bezel 28 includes an aperture 38 through which a display screen 40 of the monitor 30 is visible when the monitor 30 is coupled to the bezel 28. In some embodiments, the monitor 30 may be pivotally coupled to the bezel 28 so that the display screen 40 may be tilted upward or downward for better viewing by a passenger seated in the next-aft passenger seat 18.

The material used to cover the monitor 30 and/or the display screen 40 may include a variety of material including but not limited to multiple layers of materials held together using different processes and materials, such as glass, clear polymers, clear films, or any other material that may function as a lens or be used as an addition to the lens for any reason (i.e., to limit the viewing angle, protect the lens from scratching, etc.).

Figure 4:
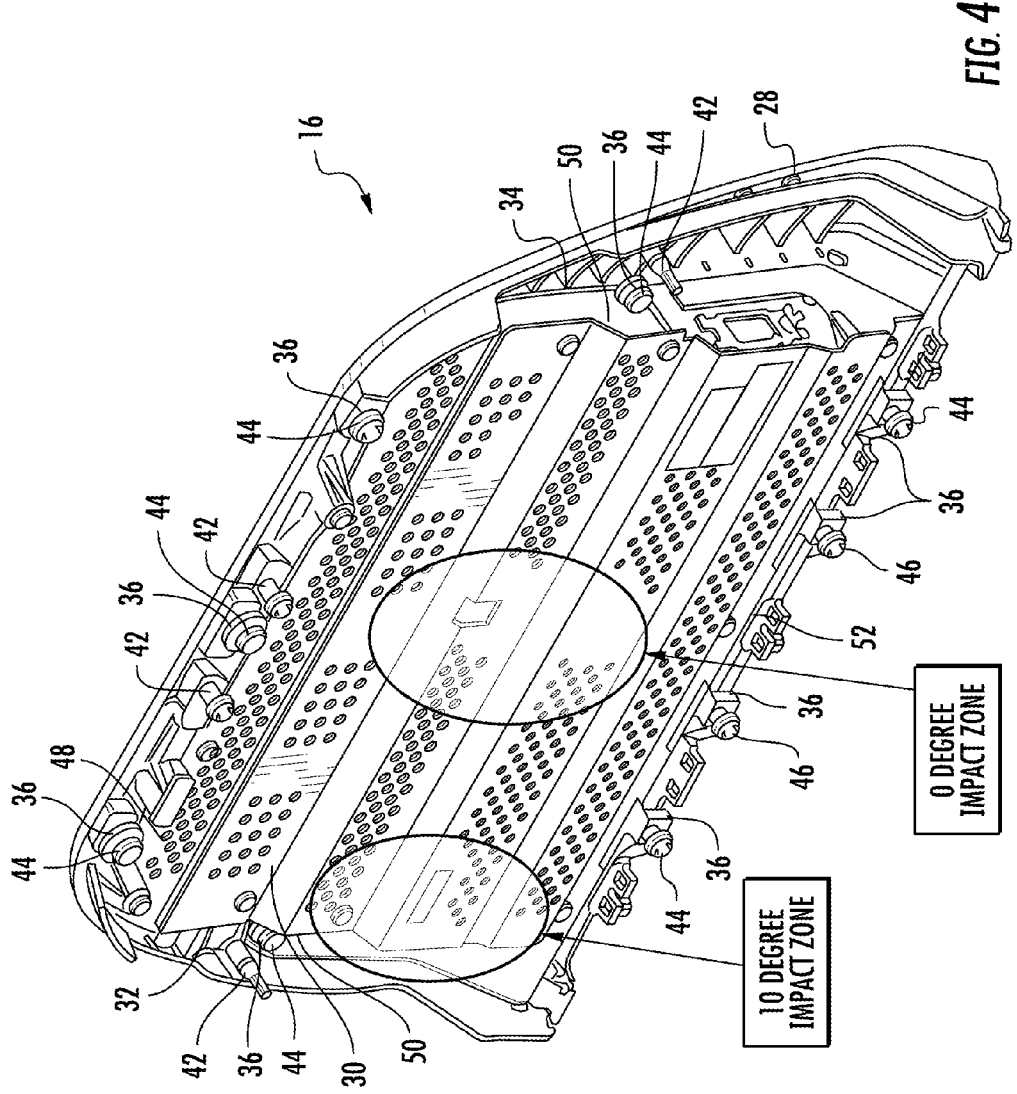
FIG. 4 is a forward perspective view of the assembled video shroud and bezel assembly of FIG. 2.

Once the monitor 30 is attached to the bezel 28 to form the bezel assembly 16, the bezel assembly 16 is then attached to the seatback 12 and/or the video shroud 14 via any suitable mechanical fasteners including but not limited to screws, bolts, or other similar fastening devices. In certain embodiments, as illustrated in FIGS. 1 and 4, the bezel assembly 16 is attached to the seatback 12 and the video shroud 14 via fasteners inserted through attachment points 42.

In these embodiments, the bezel assembly 16 is configured to substantially fit within the three dimensional shape of the video shroud 14 and the recess 20. As a result, the bezel assembly 16 may have any suitable thickness that approximates the depth of the recess 20. In some embodiments, it may be sufficient for a portion of the bezel assembly 16 to be surrounded by the recess 20, while another portion of the bezel assembly 16 extends into the space outside the recess 20.

Figure 5A:
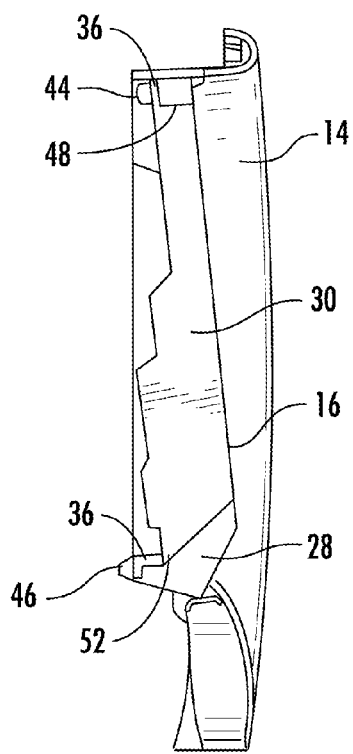
FIG. 5A is a side cross-sectional view of the assembled video shroud and bezel assembly of FIG. 2 showing the location of the monitor before a head impact.
Figure 5B:
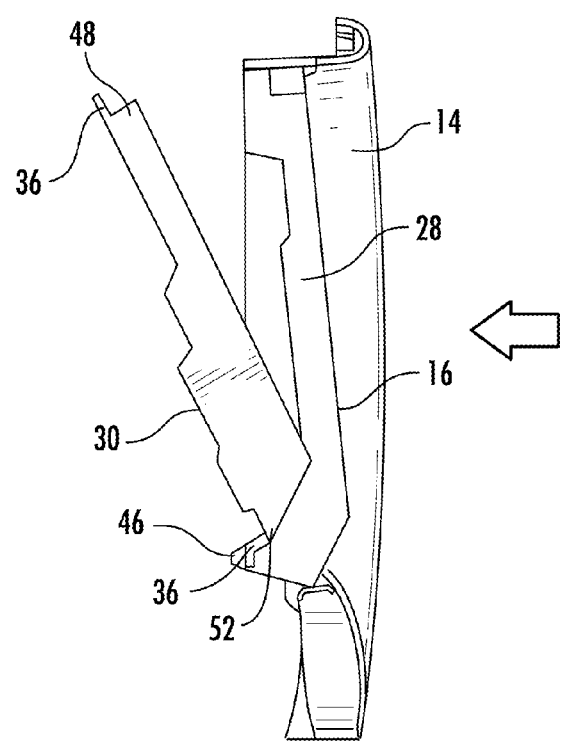
FIG. 5B is a side cross-sectional view of the assembled video shroud and bezel assembly of FIG. 2 showing the location of the monitor during a head impact.

In order to lower the initial impact (one of the aspects that controls the magnitude of HIC), the monitor 30 may be fastened to the bezel 28 in a manner that allows the monitor 30 to pivot forward in relation to the bezel 28 during a head impact condition. In these embodiments, as best illustrated in FIGS. 5A-5B, the monitor 30 pivots forward into the space created between the mounted location of the monitor 30 and the back surface 22 of the seatback 12 when a force from a head impact is applied to the monitor 30 (as illustrated by the arrow and the rotated monitor 30 in FIG. 5B). When the monitor rotates forward, the monitor 30 transfers the force to the back surface 22 of the seatback 12.

In certain embodiments, the energy absorber design is accomplished through a combination of low load fasteners 44 and high load fasteners 46 that are used to attach the monitor 30 to the bezel 28 via the attachment tabs 36, wherein the low load fasteners 44 and the high load fasteners 46 have varying tensile and shear strengths.

Suitable materials for the low load fasteners 44 may include but is not limited to nylon, which has a relatively low K value (stiffness (F)=KX), and which is therefore designed to breakaway easily and impart less energy on the edges. However, one of ordinary skill in the relevant art will understand that any suitable materials may be used for the low load fasteners 44 that have material characteristics designed to fail or shear from a force applied to the monitor 30 during a head impact, which in turn allows energy dissipation to occur. In certain embodiments, up to approximately a 2000 lb force from a head impact may be distributed among the low load fasteners 44.

Suitable high load fasteners 46 may include but is not limited to steel, which has a relatively high K value, and which is therefore designed to withstand a force applied to the monitor 30 during a head impact so as to hold the monitor 30 to the bezel 28. Specifically, the high load fasteners 46 have a higher tensile strength and/or normal and/or shear force compared to the low load fasteners 44. However, one of ordinary skill in the relevant art will understand that any suitable materials may be used for the high load fasteners 46 that have material characteristics designed to withstand the force applied to the monitor 30 during a head impact.

The locations of the low load fasteners 44 and the high load fasteners 46 are selected such that during a head impact, the monitor 30 will separate from the bezel 28 in the locations of the low load fasteners 44 and remain attached to the bezel 28 in the locations of the high load fasteners 46. For example, in some embodiments, as illustrated in FIG. 4, the low load fasteners 44 are inserted through the attachment tabs 36 located on an upper edge 48 and side edges 50 of the monitor 30. For the attachment tabs 36 located on a lower edge 52 of the monitor 30, low load fasteners 44 are inserted through the outer attachment tabs 36, and high load fasteners 46 are inserted through the inner attachment tabs 36.

As a result, as illustrated in FIGS. 5A-5B, the monitor 30 separates from the bezel 28 around the upper edge 48 and the side edges 50, and remains connected to the bezel along the lower edge 52. The monitor 30 will then pivot forward about the lower edge 52 that is connected to the bezel 28 via the high load fasteners 46 after the low load fasteners 44 fail (as shown in FIG. 5B). In addition to creating this hinge effect, the locations of the low load fasteners 44 also controls the specific area of deflection/deformation of the monitor.

The locations of the low load fasteners 44 and the high load fasteners 46 may be adjusted through design changes or by interchanging low load fasteners 44 and high load fasteners 46 to optimize the design to create the lowest head impact result or to control the deflection and/or deformation of the monitor 30.

Control of the deflection and/or deformation of the monitor 30 may also prevent delamination of the glass in the display screen 40. The quality of the glass and the process of lamination are also significant variables that influence how the glass behaves. As a result, it is important that the series of low load fasteners 44 and high load fasteners 46 can be positioned in any pattern around the monitor 30 and that the number of low load fasteners 44 and high load fasteners 46 can be varied in response to variations in glass quality and lamination.

Furthermore, a head impact dissipated on the monitor 30 may result in a uniform or non-uniform impact depending on the impact location (as a result of zero or 10 degree impact events), as shown in FIG. 4, and may therefore result in additional arrangements of low load fasteners 44 and high load fasteners 46. For example, in the case of a 10 degree HIC test where the impact of the head occurs to one side of the monitor 30, the impact area occurs in a location where the video shroud 14 aligns with the stiffer seatback 12, which transfers high force back to the passenger's head and creates the sensation of high acceleration. To reduce the stiffness in this area, a low load fastener 44 is one of the options for this location in order to release the high energy, which occurs as soon as the monitor 30 is detached from the bezel 28 at that side.

Use of low load fasteners 44 in place of high load fasteners 46 in strategic locations has minimal cost, and also avoids additional weight that would otherwise result through the use of additional brackets that would be required to achieve similar energy absorption results. The design also provides the ability to absorb energy at the source of the impact on the monitor 30, as well as providing a design that can absorb test to test variation in HIC values and minimize the risks of display screen 40 delamination.

In certain embodiments, the bezel 28 and the video shroud 14 may be replaced with an integrated shroud assembly. In other embodiments, the monitor 30 may be installed directly into a seatback 12 that has the mounting receptacles integrated into the seatback 12.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A video monitor assembly comprising:
a bezel assembly coupled to a passenger seatback, wherein the bezel assembly comprises a monitor and a bezel, wherein at least a first end of the monitor is coupled to the bezel via low load fasteners and a second end of the monitor is coupled to the bezel via high load fasteners;
wherein the bezel is shaped to form an open area that extends between a rear surface of the monitor and a surface of the passenger seatback;
wherein the low load fasteners have a lower tensile strength, which causes the low load fasteners to shear or fail when subjected to a load of more than approximately 2000 lb;
wherein the high load fasteners have a higher tensile strength, which allows the high load fasteners to withstand a load of more than approximately 2000 lb without shearing or failing; and
wherein the first end of the monitor uncouples from the bezel and rotates into the open area toward the passenger seatback while the second end of the monitor remains connected to the bezel when a load of more than approximately 2000 lb is applied to the monitor.

2. The video monitor assembly of claim 1, wherein the low load fasteners are located at least around an upper edge and sides of the monitor.

3. The video monitor assembly of claim 1, wherein the low load fasteners are formed of nylon.

4. The video monitor assembly of claim 1, wherein the high load fasteners are formed of steel.

5. The video monitor assembly of claim 1, wherein the monitor further comprises a display screen, which does not delaminate when a load of more than approximately 2000 lb is applied to the monitor.

6. The video monitor assembly of claim 1, wherein a video shroud is positioned between the bezel assembly and the passenger seatback.

7. A passenger seat comprising:
(a) a passenger seatback; and
(b) a bezel assembly coupled to the passenger seat back, wherein the bezel assembly comprises a monitor and a bezel, wherein at least a first end of the monitor is coupled to the bezel via low load fasteners and a second end of the monitor is coupled to the bezel via high load fasteners;
wherein the bezel is shaped to form an open area that extends between a rear surface of the monitor and a surface of the passenger seatback;
wherein the low load fasteners have a lower tensile strength, which causes the low load fasteners to shear or fail when subjected to a load of more than approximately 2000 lb;
wherein the high load fasteners have a higher tensile strength, which allows the high load fasteners to withstand a load of more than approximately 2000 lb without shearing or failing; and
wherein the first end of the monitor uncouples from the bezel and rotates into the open area toward the passenger seatback while the second end of the monitor remains connected to the bezel when a load of more than approximately 2000 lb is applied to the monitor.

8. The passenger seat of claim 7, wherein the low load fasteners are located at least around an upper edge and sides of the monitor.

9. The passenger seat of claim 7, wherein the low load fasteners are formed of nylon.

10. The passenger seat of claim 7, wherein the high load fasteners are formed of steel.

11. The passenger seat of claim 7, wherein a video shroud is positioned between the bezel assembly and the passenger seatback.

12. A video monitor assembly comprising:
a bezel assembly coupled to a passenger seatback, wherein the bezel assembly comprises a monitor and a bezel, wherein at least a first end of the monitor is coupled to the bezel via at least a plurality of low load fasteners;
wherein the bezel is shaped to form an open area that extends between a rear surface of the monitor and a surface of the passenger seatback;
wherein the low load fasteners have a low tensile strength, which causes the low load fasteners to shear or fail when subjected to a load of more than approximately 2000 lb; and
wherein the first end of the monitor uncouples from the bezel and rotates into the open area toward the passenger seatback when a load of more than approximately 2000 lb is applied to the monitor.

13. The video monitor assembly of claim 12, wherein the low load fasteners are located at least around an upper edge and sides of the monitor.

14. The video monitor assembly of claim 12, wherein the low load fasteners are formed of nylon.

15. The video monitor assembly of claim 12, wherein the monitor further comprises a display screen, which does not delaminate when a load of more than approximately 2000 lb is applied to the monitor.

* * * * *